May 27, 1947.  L. DE FOREST  2,421,248
METHOD OF AND APPARATUS FOR DETERMINING ABSOLUTE ALTITUDE
Filed May 10, 1941
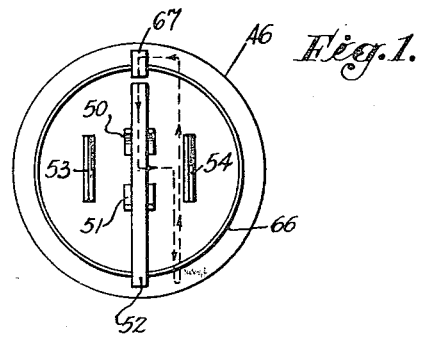
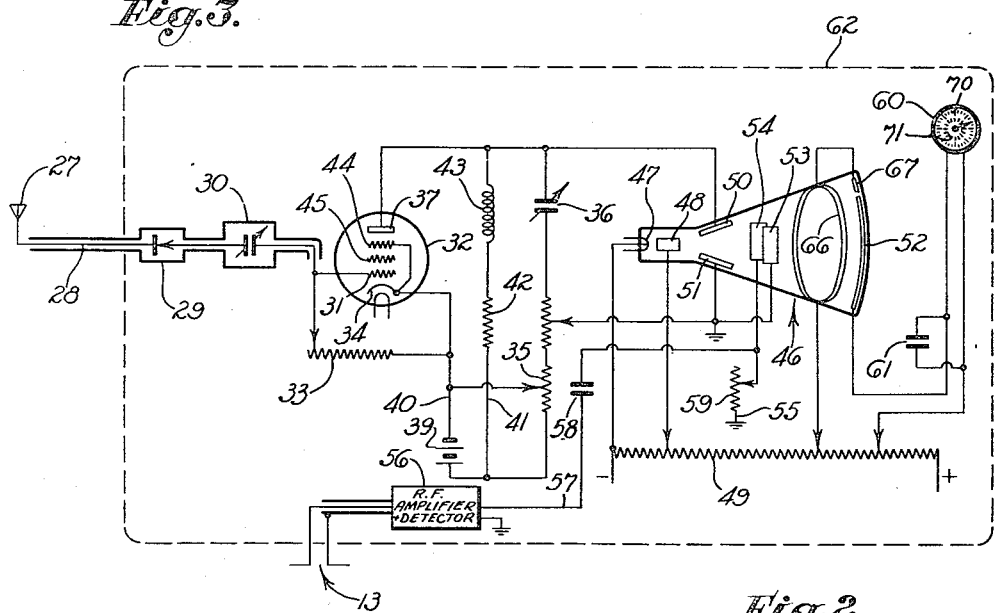
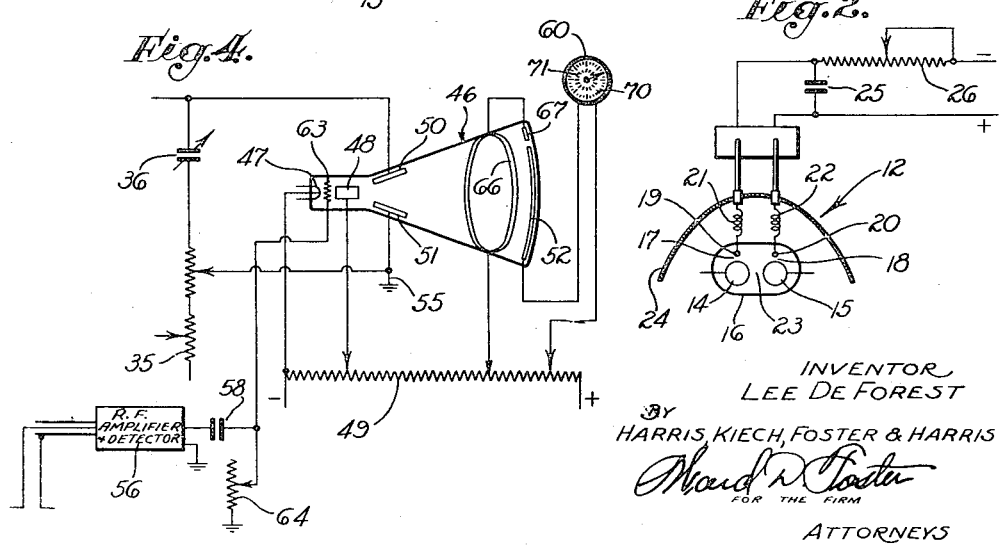
INVENTOR
LEE DE FOREST
BY
HARRIS, KIECH, FOSTER & HARRIS
ATTORNEYS Patented May 27, 1947

2,421,248

UNITED STATES PATENT OFFICE 2,421,248

METHOD OF AND APPARATUS FOR DETERMINING ABSOLUTE ALTITUDE

Lee de Forest, Los Angeles, Calif., assignor to Allen B. DuMont Laboratories, Inc., a corporation of Delaware Application May 10, 1941, Serial No. 392,900

3 Claims. (Cl. 250—1.66)

My invention relates to an improved method of and apparatus for determining the absolute altitude of airplanes or airships above the terrain or the distance of an airplane, airship, or ship from land or other physical objects. My invention contemplates the use of a high frequency electric impulse radiated from an airplane, for example, and the measurement of the period of time elapsing between the generation of the impulse and the receipt at the plane of the echo or reflected impulse from the ground or other object.

More specifically, it is an object of my invention to produce in a cathode-ray beam tube a sudden alteration in the trace of the cathode-ray beam as the result of the electromagnetic impulse generated from the plane and a second sudden alteration in this beam as the result of the reflected electromagnetic impulse, the two alterations being employed to present a visible indicia of the time elapsing between the generation of the direct impulse and the receipt of the reflected impulse and hence an indication of the distance between the plane and physical object reflecting the impulse.

It is a more specific object of my invention to utilize such alterations in the traces of the cathode-ray beam to produce a clear visible indication without the use of a shadow box or fluorescent screen, which indication is directly readable by the observer in terms of distance between the plane and the reflecting object.

It is still another object of my invention to provide means for supplying such an indication which are quickly and easily adjustable for changing the scale of the indication to different values for use for different distances between the plane and the reflecting object, thus facilitating the accurate reading of the indication by the observer.

In its broad aspects my invention contemplates the measurement of a time interval by moving a cathode-ray beam a distance which is a function of the time interval and providing a perceptible indication in a current-responsive device of the length of travel of the beam.

Among the other objects of my invention is the provision of an apparatus for indicating the absolute distance between the plane and the reflecting object which is light in weight, inexpensive in construction, and operative for short distances between the plane and the reflecting object.

My invention will be better understood by reference to the accompanying drawing in which Fig. 1 is a diagrammatic face view of a cathode-ray tube employed in my apparatus;

Fig. 2 is a wiring diagram illustrating a transmitter of my invention;

Fig. 3 is a wiring diagram of a receiving apparatus of my invention; and

Fig. 4 is a wiring diagram of a modified embodiment of a receiving apparatus of my invention.

Referring to the drawing, which is for illustrative purposes only, the prefered form of the invention includes a transmitter 12 which may be mounted near the tip of one wing of the airplane and a receiving antenna 13, preferably dipolar, which may be mounted near the tip of the other wing. As illustrated in Fig. 2, the transmitter 12 is of the spark gap type and includes two electrodes 14 and 15, illustrated as balls enclosed in a glass envelope 16 with a gas under pressure, for example, hydrogen or nitrogen. The balls 14 and 15 are separated by small gaps 17 and 18 from smaller balls 19 and 20, respectively, which are connected through radio frequency choke coils 21 and 22, respectively, to a source of suitable current, which may be a direct current but which is preferably an alternating current, such as provided through a spark coil. The spark gap between the balls 14 and 15, indicated by the numeral 23, is located at the focal point of a parabolic reflector 24, which may be mounted on the wing of the airplane 11, so that it is shiftable between horizontally and downwardly directed positions.

When employing direct current, a storage condenser 25 is connected in shunt across the electrodes or balls 14 and 15 through a variable resistance 26. The frequency with which the condenser is charged and discharged depends upon the voltage of the direct current source, the capacity of the condenser 25, and the value of the variable resistance 26 inserted in the supply line.

With either a direct current or an alternating current, as above described, the radio frequency choke coils 21 and 22 cause the spark discharge to assume dual characteristics, a low frequency discharge and a superimposed extremely high frequency discharge, the period of the low frequency discharge being determined by the capacity of the condenser 25, if such is employed, and the capacity between the two electrodes or balls 14 and 15. The small gaps 17 and 18 are broken down when the ball electrodes 14 and 15 are charged and opened after the balls 14 and 15 have received their full charge. When the main gap 23 between the ball electrodes 14 and 15 is broken down by the spark discharge, the conductors above the electrodes 14 and 15 form no part of this capacity so that the discharge is of extremely short wave length.

Moreover, the radio frequency choke coils 21 and 22 offer a high impedance to the superimposed extremely high frequency impulse, so that the period of the ultra-high frequency discharge is determined almost wholly by the capacity of the two spark gap terminals or electrodes. The frequency of the spark discharge may be varied between wide limits, for example, from less than 50 to 1,000 per second.

The spark gap transmitter, by generating aperiodic impulses in damped wave form, provides highly important advantages over a tube system for generating periodic impulses in the form of undamped waves, in that a much greater amount of energy may be transmitted, a higher degree of reflectivity of the impulses secured, and a reflected wave not so highly directional obtained.

Furthermore, since practically all of the energy from the spark discharge is concentrated in a single wave, the echo or reflected wave may be received by the plane without overlapping the transmission of the direct impulse, while the plane is much closer to the reflecting object than when periodic undamped impulses from a tube transmitter are employed, since in the latter the energy is discharged through a very considerable number of waves, taking substantially longer for their generation by the transmitter.

Even if the spark is quenched as late as the end of the third or fourth oscillation, the wave length of the radiation being of the order of two meters, the duration of signal radiation will correspond to a total signal travel of less than ten meters. In such event the system may be employed to measure altitudes as low as five meters, i. e., one-half of the total signal travel of ten meters. At this minimum distance the interval between the pickup by the antenna 27 and the pickup by the receiver 13 will be of the order of ⅓₀ micro-second.

As indicated in Fig. 3, the directly transmitted electromagnetic impulse may be picked up by a short antenna 27 and conveyed through a conductor 28, a rectifier 29, and a condenser 30 to a control grid 31 of a pentode discharge tube 32 and to a variable grid biasing resistance 33 connecting the grid 31 to the cathode 34. A variable resistance 35 and condenser 36 supply the discharge path which includes the anode 37 and cathode 34 of the pentode tube 32. The condenser charging voltage is supplied by a direct current source 39 through conductors 40 and 41 and resistance 42. 43 indicates a radio frequency choke coil interposed between the resistance 42 and the anode 37.

The numeral 44 indicates a suppressor grid connected to the cathode 34 for reducing the capacity between the control grid 31 and the anode 37. A screen 45 is interposed between the suppressor grid 44 and cathode 34 and is connected to a positive potential not shown. The value of the negative potential impressed upon the grid 31 of tube 32 can be regulated by means of the resistance 33 so that normally no current passes through the tube 32. When a spark discharge occurs, the first half cycle of such discharge always results in an impulse of the same polarity, the electrodes 14 and 15 being connected to the current source in such manner as to accomplish this result. A positive impulse is passed by the rectifier 29 along the conductor 28 to make the control grid 31 positive. When the grid 31 of the tube 32 is caused to swing positive, the condenser 36 begins to discharge through the path between the anode 37 and the cathode 34 of the tube 32.

The numeral 46 indicates a cathode-ray tube including a cathode 47 and an anode 48 supplied from a voltage divider 49 connected across a D. C. supply of, for example, 1500 volts. Included in the cathode-ray tube 46 are two deflecting plates 50 and 51 for deflecting the cathode-ray beam vertically, and called "vertical deflecting plates" herein. The lower deflecting plate 51 is grounded, and the upper deflecting plate 50 is connected to condenser 36. Until the condenser 36 begins to discharge, the cathode-ray beam is held deflected above the end of a meter control element 52 by the positive charge on the upper plate 50 from the source of current supply 39. The meter control element 52 may be either a high resistance means or a low resistance means. The numeral 66 indicates a collector ring anode connected to an insulated metallic plate 67 above the meter control element 52 and connected to the voltage divider 49 completing the circuit. When the condenser 36 discharges, the lower deflector plate 51 is charged to a higher positive potential than the upper plate 50, thus attracting the cathode-ray beam downwardly at a velocity determined by the electrical constants of the discharge circuit.

The plane of the initial downward sweep of the cathode-ray beam is midway between left and right deflecting plates 53 and 54 for deflecting the cathode-ray beam horizontally, and called herein horizontal deflecting plates, the left deflecting plate 53 being connected to ground at 55 and the right deflecting plate 54 being uncharged.

When the electromagnetic impulse reflected from the earth is received on the dipolar antenna 13, it is greatly amplified by a radio frequency amplifier and detector 56 of conventional construction and the desired number of stages. The output of the amplifier and detector 56 is transmitted preferably through a conductor 57 and condenser 58 to the vertical deflecting plate 54, which is connected to ground at 55 through a variable resistance 59. A negative output impulse of the amplifier 56 impresses a negative charge upon the deflector plate 54, instantaneously moving the cathode-ray beam toward the deflecting plate 53, or if the output of the amplifier is a positive impulse, the beam will be attracted toward the plate 54. The cathode-ray beam completes its downward sweep and its return upward in the latter plane adjacent the right deflector 54 under the influence of the negative charge on the left deflector plate 53, which remains thereon for the time interval required as a result of the adjustment of the variable resistance 59 between this plate and the ground 55.

It will thus be seen that the cathode-ray beam begins its downward sweep in a plane midway between the deflecting plates 53 and 54, as indicated in Fig. 1, and impinges upon the meter control element 52 at the exact instant that the direct signal is generated by the transmitter, or so nearly such exact instant that the meter hereinafter described may be readily calibrated to allow for the minute time interval. It will be seen further that the cathode-ray beam travels in this plane until the receipt of the echo or reflected electromagnetic impulse from the earth, so that its length of travel in this plane is a function of the distance of the plane from the earth.

If the meter control element 52 be made of a high resistance coil or a graphite strip, it may be connected to the voltage divider and a suitable microammeter 60 or any meter integrating the current passing therethrough with a condenser 61 in the circuit, if desired, so that the microammeter, by indicating the amount of current flowing through the meter control element 52, indicates the length of the meter control element in circuit and thus the length of travel of the cathode-ray beam in the plane midway between the deflecting plates 53 and 54. If the microammeter 60 be of a ballistic type, the condenser 61 is not required. Since the microammeter 60 measures the length of the sweep of the cathode-ray beam in the plane midway between the deflecting plates 53 and 54, and hence the distance between the plane and the ground, it will be obvious that it may be calibrated to read directly in feet or hundreds or thousands of feet, thus giving the pilot a direct altitude reading.

If the meter control element 52 is a high resistance member, it may be connected in circuit either so that the resistance increases or decreases as the sweep of the cathode-ray beam increases, the meter being calibrated accordingly. Also if the meter is suitably calibrated, the beam need not pass off the upper end of the high resistance member, but may contact such upper end when the beam is stationary.

The entire receiving apparatus is shielded, as indicated by the broken line 62.

I may cause the sweep of the cathode-ray beam to measure the distance to the earth by ending its downward sweep as a function of such distance and returning the beam upon the same path instead of deflecting it to a different path. A circuit for accomplishing such operation is illustrated in Fig. 4.

As illustrated in the fragmentary wiring diagram of Fig. 4, in which the elements similar to those previously described are correspondingly numbered, such a circuit differs from the circuit previously described, in that the radio frequency amplifier and detector 56, instead of being connected to the deflector plate 53, is connected to a grid 63 of the cathode-ray tube 46, so that the negative output of the amplifier and detector discharged through the condenser 58 is impressed upon the grid 63, cutting off the cathode ray. A variable resistance 64 is adjusted so that the negative charge is retained upon the grid 63 for a period of time approximating the time consumed by the return of the beam to its uppermost position and less than the time interval between the receipt of one reflected impulse and the generation of the next impulse.

It will be seen that with such a circuit the distance of travel of the cathode-ray beam from its uppermost position to the instant the reflected electromagnetic impulse is received and the sweep of the beam cut off is a measure of the distance of the plane from the earth or other reflecting object. A meter control element and circuit therefor, such as previously described, may be employed to give a visible indication of altitude by measurement of the length of travel of the cathode-ray beam.

One purpose of making the resistance 35 variable is to permit the use of more than one scale on the dial of the microammeter 60, if desired. Thus the dial in Fig. 3 is shown with an outer scale 70 and an inner scale 71, the inner scale being graduated in longer scale lengths to enable the pilot to read the values accurately at low altitudes of the airplane. Different settings of the variable resistance 35 are required for use with the two different scales 70 and 71.

While I have described my invention as applied to a determination of the absolute altitude of an airplane above the terrain, it will be understood that my invention is not restricted to such use, but may be employed to determine the distance between any stated point and any reflecting object, and is capable of use to measure time intervals independently of measurements of distance.

I claim as my invention:

1. A distance-indicating device, including: a spark-gap transmitter for transmitting toward an object, the distance of which is to be measured, an aperiodic damped electromagnetic impulse; means for receiving the reflection of said impulse from such objects; means for producing a cathode-ray beam; means for causing said cathode-ray beam to sweep along a defined path, said causing means being responsive to the transmission of an impulse by said transmitter; means for causing interruption of the sweep of said beam along said defined path in response to receipt of the reflected impulse by said receiving means; an electric circuit providing for flow of electric current therein; means including an element of high electrical resistance in the path of movement of said beam to vary the flow of current in said circuit in response to variations in the time interval between transmission of said impulse and said receipt of the reflection of the impulse; and means in said circuit responsive to variations in the flow of current in the circuit.

2. A distance-indicating device, including: a transmitter for transmitting toward an object, the distance of which is to be measured, an aperiodic damped electromagnetic impulse; means for receiving the reflection of said impulse from such object; means for producing a cathode-ray beam; means for causing said cathode-ray beam to sweep along a defined path in response to transmission of an impulse by said transmitter; means to interrupt the movement of said beam along said path in response to receipt of the reflection of the impulse by said receiver; a conductor extending along said path; means to form a circuit including said beam and said conductor in series whereby current flows in the circuit while said beam is on said path; and means controlled by said circuit to indicate the interval of time said beam is on said path.

3. A distance-indicating device, including: a spark-gap transmitter for transmitting toward an object, the distance of which is to be measured, an aperiodic damped electromagnetic impulse; means for receiving the reflection of said impulse from such object; means for producing a cathode-ray beam; means to initiate movement of said beam along a path in response to transmission of an impulse by said transmitter; means for terminating the movement of said beam along said path in response to receipt of the reflected impulse by said receiving means; a conductor of relatively high resistance extending along said path; means to form a circuit with said beam and said conductor in series whereby current flows in the circuit in accord with the distance along said path traversed by the beam; and indicating means responsive to the flow of current in said circuit.

LEE DE FOREST.

REFERENCES CITED

The following references are of record in the file of this patent:

UNITED STATES PATENTS

| Number | Name | Date |
|---|---|---|
| 1,759,915 | Potter | May 27, 1930 |
| 2,096,653 | Soller | Oct. 19, 1937 |
| 2,225,046 | Hunter | Dec. 17, 1940 |
| 2,227,598 | Lyman et al. | Jan. 7, 1941 |
| 1,757,345 | Strobel | May 6, 1930 |

FOREIGN PATENTS

| Number | Country | Date |
|---|---|---|
| 328,680 | Great Britain | May 5, 1930 |